(12) United States Patent
Döhring et al.

(10) Patent No.: US 8,471,181 B2
(45) Date of Patent: Jun. 25, 2013

(54) HEATING DEVICE FOR WALL, CEILING OR FLOOR COVERINGS

(75) Inventors: Dieter Döhring, Lampertswalde (DE); Heinz Zorn, Eggersdorf (AT); Gerhard Kremer, Fürstenfeld (AT); David Macher, Voitsberg (AT)

(73) Assignee: Kronoplus Technical AG, Niederteufen (CH)

( * ) Notice: Subject to any disclaimer, the term of this patent is extended or adjusted under 35 U.S.C. 154(b) by 1084 days.

(21) Appl. No.: 11/996,877

(22) PCT Filed: Feb. 8, 2005
(Under 37 CFR 1.47)

(86) PCT No.: PCT/EP2005/050548
§ 371 (c)(1),
(2), (4) Date: Apr. 6, 2009

(87) PCT Pub. No.: WO2006/076967
PCT Pub. Date: Jul. 27, 2006

(65) Prior Publication Data
US 2009/0321414 A1  Dec. 31, 2009

(30) Foreign Application Priority Data
Jan. 19, 2005  (DE) .................... 20 2005 000 886 U

(51) Int. Cl.
*H05B 3/06* (2006.01)
*H05B 3/54* (2006.01)

(52) U.S. Cl.
USPC ........................................ 219/522; 219/528

(58) Field of Classification Search
USPC ......... 219/522, 528, 529, 535–538, 541–549, 219/552, 553
See application file for complete search history.

(56) References Cited

U.S. PATENT DOCUMENTS

| | | | | |
|---|---|---|---|---|
| 2,853,589 A * | 9/1958 | Crooke | | 219/543 |
| 2,889,439 A * | 6/1959 | Musgrave | | 392/435 |
| 3,095,491 A * | 6/1963 | Deacon | | 392/435 |
| 3,318,760 A * | 5/1967 | Boenig et al. | | 428/530 |
| 4,032,751 A * | 6/1977 | Youtsey et al. | | 219/538 |
| 4,154,882 A * | 5/1979 | Ungar et al. | | 428/165 |
| 4,990,744 A * | 2/1991 | Willner | | 219/213 |
| 6,188,839 B1 | 2/2001 | Pennella | | |
| 6,649,886 B1* | 11/2003 | Kleshchik | | 219/529 |
| 6,958,463 B1* | 10/2005 | Kochman et al. | | 219/544 |

FOREIGN PATENT DOCUMENTS

| | | |
|---|---|---|
| DE | 4112565 | 10/1992 |
| DE | 29900958 | 5/1999 |
| DE | 19850676 | 5/2000 |
| EP | 0357945 | 3/1990 |
| EP | 0486891 | 5/1992 |
| EP | 0486892 | 5/1992 |
| WO | 99/62301 | 12/1999 |

OTHER PUBLICATIONS

Search Report for corresponding application No. PCT/EP2005/050548 dated Oct. 13, 2005.

* cited by examiner

*Primary Examiner* — Sang Paik
(74) *Attorney, Agent, or Firm* — Renner, Otto, Boisselle & Sklar, LLP

(57) ABSTRACT

The invention relates to a heating device and in particular to an element of a floor heating device. Known floor heating devices comprise heating means which are arranged underneath floor coverings, for example, below stone plates, tiles, parquet elements or laminated panels. Those heating means can be made of electrically heatable films which are arranged close to the surface of a covering in order to directly heat the room.

17 Claims, 2 Drawing Sheets

HEATING DEVICE FOR WALL, CEILING OR FLOOR COVERINGS

The invention relates to a heating device and in particular to an element of a floor heating device. Known floor heating device comprise heating means, which are arranged underneath a floor covering, as for example underneath of stone plates, tiles, parquet elements or laminated panels. The heating means may consist of electrically heatable foils.

In the above mentioned prior art, the heat produced first has to penetrate the stone plates, tiles, parquet elements or laminated panels, before a room may be heated in the desired fashion. On the one hand, such a heating device reacts relatively slow. On the other hand, a relatively large amount of heat is undesirably delivered to the floor.

It is the object of the invention to provide a heating element, by means of which good heating results may be obtained.

To solve the object a flooring element comprises a heating means and is connected thereto.

To provide a room to be heated faster and in a more focused manner with the generated heat compared to the prior art, the heating means in one embodiment are not provided underneath a covering, in contract to the prior art, i.e. underneath a stone plate, tile, a parquet element or laminated panel, but in the inside of the covering, i.e. in the stone plate, the tile, the parquet element or in the laminated panel and in particularly preferred in the upper third, as seen from the surface of the flooring.

A laminate panel comprises a décor layer which is arranged on a carrying layer. The carrying layer consists usually of a board, which is usually made from a wooden material. Such a board consists currently preferably of MDF, HDF or a compact laminate, to allow for a stable connection between the panels without the application of glue.

Heat may be provided to the room to be heated in a particular fast and efficient manner, if the heating means are arranged in an advantageous embodiment of the invention between the carrying layer and the décor paper. In this case, the heat deriving from the heating means reaches the room to be heated particularly fast. A good efficiency is achieved.

The heating means consist preferably of wires or cords, which have suitably a low electrical conductivity. Thin cords or wires can be arranged inside a stone plate, a tile, a parquet element or a laminate panel. Compared to a heating device in form of a foil, comparably only few mechanical problems due to differential expansions and shrinkages inside of the covering for floors, walls or ceilings arise.

The wires or cords with low electrical conductivity have advantageously very small diameters of for example 0.5 to 0.01 mm. On the one hand, such cords or wires can be produced in a mechanically sufficiently robust manner. On the other hand, such wires or cords are thin enough to be arranged inside a stone plate, a tile, a parquet element or a laminate panel without particular problems.

For reasons of production efficiency, preferably a network or a meshwork is incorporated into a stone slap, a tile, a parquet element or a laminate panel, which comprises the wires or cords with low electrical conductivity. Such a network respectively meshwork is in particular preferred in case of a layer-wise structure of the covering consisting of stone plates, tiles, parquet elements or laminate panels. If the heating means is provided for example in the form of a meshwork, it can be processed in a similar manner as the further layers, which facilitates the production, which is in particular true in the case of laminate panels.

In case of a laminate panel the network or meshwork is pressed together with the further layers, as for example the carrying board, the resin soaked counter acting paper, the resin soaked decor paper, the resin soaked overlay as well as the resin soaked Kraft papers, if applicable. An additional work step to connect a heating device with the panel is thus not necessary.

The embodiment, in which the heating element is provided in form of a network or meshwork, is particularly advantageous in the production of laminate panels. With laminate panels, different layers are arranged above a supporting board by means of a resin. The resin used for the manufacturing of the laminate panels can penetrate the network, respectively the meshwork. This guarantees a mechanical stable surface. The meshwork may further improve the impact resistance of the surface of a laminate panel, and in particular if the meshwork comprises cords with a high tensile strength, as for example glass fibers. The improved impact resistance is in particular an advantage if the panels form a floor covering.

To provide the desired heating performance, the electrical resistance of a cord destined for the heating or of a wire destined for the heating has to be chosen suitably small. As a base material for alloys of resistant wires in particular Cu, Ni and Fe are suitable and in particular with the following compositions respectively weight percentages:

Ni—Cr (65%-80% Ni+1.5% Si; for example 80-20)
Ni—Cr—Fe (35%-60% Ni+Si, Nb; for example 60-15-24)
Ni—Cr—Co—Mo—Ti
Cu—Ni with an amount of 2-45% Ni
Ni—Cr—Al with an amount of 35-95% Ni
Ni—Cr—Si with an amount of 70-80% Ni
Fe—Cr—Al(—Mo)

The above contemplated alloys have suitable electrical resistances which are in particular at a temperature of 20° Celsius between 50 and 150 µOhm/cm$^3$.

Ni—Cr as well as Ni—Cr—Al are particularly preferred. These alloys are compared to alloys with an high amount of iron advantageously non-magnetic, which is usually desired in coverings. Compared to Cu—Ni alloys, the Ni—Cr alloys have advantageously a lower density and thermal expansion. In particular low thermal expansion is an advantage, since thereby the stability of the final products may be improved. Another advantage is, that the tensile strength and the electrical resistance is higher compared to Cu—Ni alloys, which is also an advantage in the final product.

To increase the electrical resistance, but also the thermal conductivity, with the preferred Ni—Cr alloy, advantageously an amount of chromium of at least 10%, preferably of at least 15% by weight is provided in the alloy.

Known alloys, which basically meet the demands, are usually relatively brittle. The production of a wire from a brittle alloy is problematic. An alloy of NiCr20AlSi has shown to be particularly suitable, and is in particular preferred with following weight percentages: 3.5 Al, 20 Cr, Fe 0.5 and the rest Ni. The alloy can further comprise Si as for example 1% of Si. The alloy offers a suitable electrical conductivity and is on the other hand still mechanically suitable to produce a wire with a diameter of less than 0.05 mm by means of drawing. In doing so, the amount of Cr can be varied. For example, it can be 15-25% by weight in the alloy.

The preferably applied NiCr alloy contains small amounts of Si in the range of a few percent by weight, for example of less than 3% by weight and more preferred of less than 0.5% by weight. In this way, the tensile strength of the alloy is in particular increased.

The addition of aluminum advantageously improves, among others, the corrosion properties and leads to a solid solution hardening. Therefore, preferably the NiCr alloy contains several percent by weight of aluminum and preferred of 1-5% by weight.

To reduce the manufacturing costs, the network or meshwork consists on the one hand of wires or cords with which the desired heat can be produced; in the following denoted as heating wires respectively heating cords; and on the other hand of comparably low cost cords, with which the heating wires respectively the heating cords are interwoven. The comparably low cost cords consist for example of electrically non-conductive plastic material, glass enforced plastics or of glass fibers.

Preferably, the heating wires respectively the heating cords are arranged parallel to each other in one direction inside of a network or a meshwork and the comparably low cost cords run essentially perpendicular thereto. Such an arrangement is suitable for a further processing of the network without any distortions.

To process a network or meshwork serving as a heating device like a material web, as for example a décor paper or a counter acting paper, the materials of the network have to be chosen such that the cords or the wires do not wobble or distort. To achieve this aim, the comparably low cost cords consist preferably of glass fiber reinforced plastics or glass fibers or of a plastic material with a similar tensile strength.

To further reduce the distortion of the network respectively meshwork during processing, the diameter of the comparably low cost cords corresponds advantageously to the diameter of the heating wires or the heating cords.

If a laminate panel is produced, the upper layers are impregnated with resin, which provides for the connection of the layers. With respect to the expansion properties, glass fibers are particularly well suited to be integrated into the surface of such a panel. Further, the surface of the panel is in this case particularly impact resistant. Such panels are particularly well suited as covering for a floor.

To further reduce the costs for the manufacturing and moreover for a particularly exact adjustment of the desired electrical resistance, metallically coated cords are applied as heating wires respectively heating cords. The not yet metallically coated cords consist of for example plastics, glass fiber reinforced plastics or glass fibers. For the above given reasons, glass fibers, which are metallically coated, are particularly preferred with laminate panels.

The metallic coating is achieved in a particular cost efficient embodiment by means of vapor deposition. Although the adhesion between the metallic coating and the cord is not particularly good, this is usually not critical, since the cord is embedded in the final product and then the coating is usually not subjected to higher mechanical strains. Alternatively, a cord is metallically coated by means of sputtering. In this method, metal ions are accelerated by means of an electrical field in the direction of the cord, such that the same hit the cord with a high velocity. In this case, the connection between the cord and its metallic coating is particularly more robust compared to the case of vapor deposition. Such a heating wire respectively a heating cord may be subjected to a more heavily mechanical strain.

In a particularly preferred embodiment, a network functioning as heating element is provided with electrically relatively well conductive sections or areas, which run perpendicular to the heating wires respectively the heating cords and are electrically connected therewith. These electrically relatively well conductive sections function to provide the heating wires respectively the heating cords with electrical power. The electrical resistance of these comparably well conductive sections is thus lower compared to the electrical resistance of the heating wires respectively the heating cords. The electrically comparably well conductive sections are preferably provided by means of a metallic coating.

In a preferred embodiment of the invention the heating elements are arranged in the inside of the panels or boards, which are intended to be assembled for a covering of a floor, wall or ceiling. The heating elements of different panels or boards are connected with each other by means of electrical conductors, which pass from the heating elements out of the underside of the panels respectively the boards and which are suitably electrically connected with each other. Such elements of a covering can be installed in a simple manner, without making the electrical contacts visible on the visible surfaces of the covering for a wall, ceiling, or flooring.

The electrical connection between the different covering elements is advantageously achieved by means of plug-in connections, to provide for a simple installation. In this case, advantageously two different kinds of plug-in connections exist, which are on the one hand constructed for the connection to the positive pole and on the other hand for the connection to the negative pole. The different plug-in connections are not compatible with each other, to prevent an unintentional exchange of the electrical poles. Even a non-trained person or a do-it-yourselfer can install such a covering without any problems.

The plug-in connection comprises preferably metallic bushes or sockets, which lead to the underside of a board or of a panel of the heating device. The corresponding plug can then be inserted from the backside into the corresponding socket. The socket for the first electrical pole is in this case for example provided with a round diameter and for the other pole for example with an angular diameter. The plugs are correspondingly round or angular. In this way, the positive pole connection can easily be distinguished from the negative pole connection.

In the case of panels or plates with a rectangular surface, the power supply from one board respectively one panel to the next one is provided parallel to the longitudinal sides, as seen from the surface. The electrically better respectively well conductive sections inside of the panels, respectively inside of the walls, thus run parallel to the longitudinal sides. In this case, the same are arranged adjacent the two longitudinal sides. The heating wires respectively the heating cords are electrically connected with the two electrically well conductive sections and run perpendicular thereto, and also parallel to the small face of the board respectively the panel having a rectangular surface. Electrical current is then provided to the electrically well conductive sections and again conducted away there from. From an installation point of view, this arrangement is in the case of boards or panels with a rectangular surface particularly preferred.

For ease of installation, the electrical connection of one board respectively of one panel with rectangular surface to the next one is preferably effected parallel to the longitudinal sides. The corresponding electrical conductor, which is arranged underneath a covering made from the boards respectively the panels, thus runs parallel to the longitudinal sides of the panels, respectively the boards.

The sockets or bushes, which serve for the above mentioned electrical contacting, are in the case of boards or of panels with rectangular surface preferably arranged adjacent the longitudinal sides. Along a longitudinal side, advantageously a plurality of sockets respectively bushes is arranged, which are evenly distributed along the side. On one of the longitudinal sides, thus the sockets respectively the bushes for the positive pole are arranged and on the other side the sockets or bushes for the negative pole. This arrangement guarantees that the electrical connection between the panels respectively the boards can be handled in a flexible manner.

The power supply for such a covering is then effected from the edge of the covering and in a preferred embodiment from the edge, which is formed of the smaller sides of the boards or panels having a rectangular surface.

For the electrical connection of two panels preferably an electrically conductive flat strip cables is used, which is provided with suitable contact means. Such a flat strip cable can be arranged underneath the covering without any problems.

The electrical heating device is preferably arranged adjacent of at least one Kraft paper, i.e. adjacent to a mechanical stable paper with a paper weight of typically 100-200 g/m². Thermally introduced tensions can be reduced by means of the Kraft paper, which in turn improves the stability of the structure. In the case of a laminate panel, such a Kraft paper, which is provided to reduce the thermally introduced tensions, is for example preferably arranged between the carrying board and the heating device, which is for example provided in the form of a network or meshwork. Such thermally introduced tensions are even better reduced, if the heating device is arranged between two Kraft papers.

If the heating device is bound by means of a resin, preferably a resin is chosen, which develops a low network density in its cured or hardened condition, to reduce the thermally introduced tensions. Phenolic resin is a resin with a low network density in the sense of the present invention. An amino resin in turn is considered as having a high network density in the sense of the invention. A modified amino resin or a resin mixture can in turn be provided with a low network density in the sense of the invention.

In particular in the case of a laminate panel, the heating device is fixed by means of a resin, which develops a low network density. Layers, as for example décor paper or overlay, which are arranged on top are in turn impregnated with a resin as for example an amino resin, which develops a relatively large network density. In this way, on the one hand the reduction of thermally introduced tensions is promoted and on the other hand a good abrasion resistance, impact resistance as well as chemical resistance is achieved with the surface.

If the heating device consists of a network, a meshwork or a web of glass fibers, the same is particularly advantageously fixed by means of epoxy resin. An epoxy resin develops a low network density in the sense of the invention. In this case, the reduction of thermal tensions is particularly good, so that additional Kraft papers are not necessary for the further reduction of thermally introduced tensions.

In the following, the invention is described in more detail under reference to certain exemplary embodiments.

Figure 1:
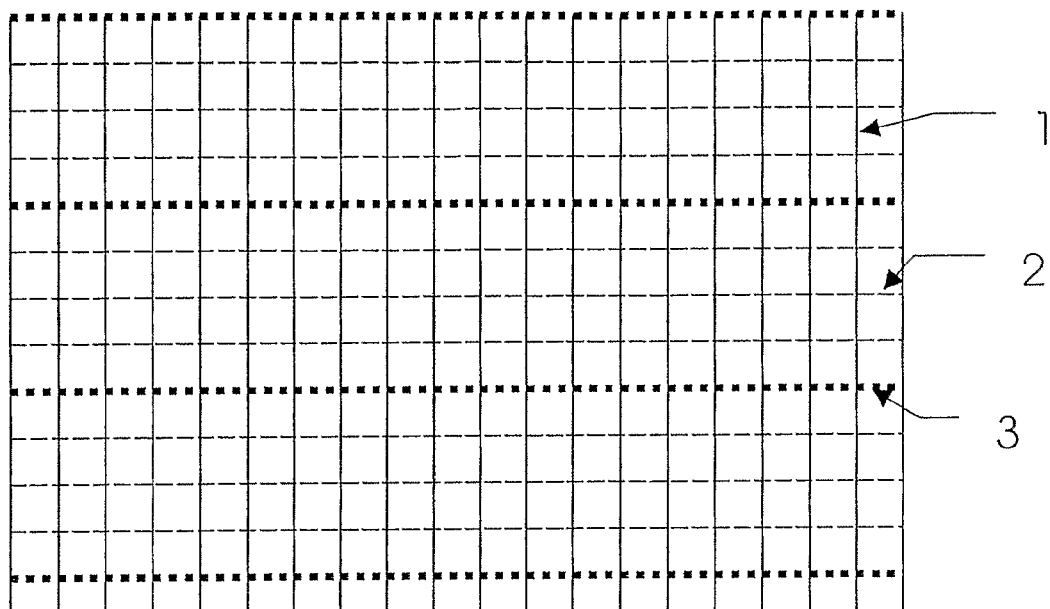
FIG. 1 shows a heating device comprising heating cords which are arranged parallel to each other in a network, meshwork or web.

FIG. 1 shows a heating device comprising heating cords 1, which are arranged parallel to each other in a network, meshwork or web. Electrically non-conductive cords 2 run perpendicular to the heating cords 1 and are interwoven with the same. In this way, a two-dimensional arrangement is provided, which is easy to process and which can be integrated into a panel. For example, highly conductive sections 3 are made by means of a metallical coating, which run parallel to the electrically non-conductive cords 2 and which are electrically connected with the heating cords 1. Between the electrically well conductive sections 3 there is always a plurality of electrically non-conductive cords 2.

In order to use such a heating device during the manufacturing of laminated panels, the distance between electrically well conductive sections 3 is typically between 1 and 40 cm. These distances are suitable for panels with a rectangular surface, which have a small side of 15-50 cm.

Figure 2:
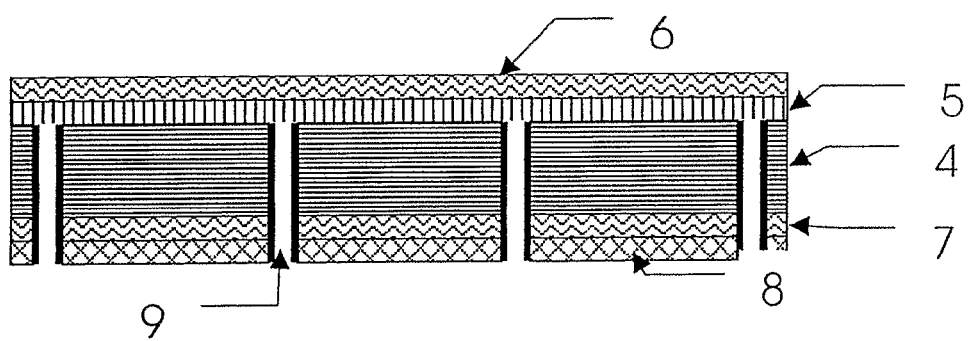
FIG. 2 shows in a cross section a typical design of a laminated panel.

FIG. 2 shows in a cross section a typical design of a laminated panel. A board 4 provides mechanical stability to the panel. Above the board, a layer system 5 is arranged, which comprises the heating device. The heating device is preferably built as it is shown in FIG. 1. However, it could also be provided in form of a foil. A layer system 5 can comprise Kraft papers, which are arranged above and/or underneath the heating device. The layer system 5 comprises preferably a resin with a low network density, i.e. a phenolic resin or an epoxy resin.

A layer system 6 is provided above the layer system 5, which comprises a resin having a higher network density. Typically this resin is an amino resin. The layer system 6 comprises usually first a décor paper with abrasion resistant particles, as for example corundum, arranged thereon. The corundum is again usually covered, for example by means of a transparent overlay.

Underneath the board 4 usually a layer system 7 with a counter acting paper is provided, which is arranged onto the board 4 by means of a resin, as for example by means of a relatively cheap urea resin. An impact sound insulation layer 8 can be provided underneath the layer system 7.

According to FIG. 1, electrically conductive bushes 9 are leading from underneath to the heating device and preferably to electrically well conducting sections 3. The bushes 9 are usually arranged along as well as adjacent to a longitudinal side of a panel having a rectangular surface. Parallel thereto, electrically conductive sections 3 run above the bushes 9. The bushes 9 being arranged underneath such an electrically well conductive section 3 have essentially the same shape and the same diameter. Bushes leading to an adjacent electrically well conductive section 3 preferably have a different shape and/or a different diameter to avoid errors during the installation of the electrical components.

Figure 3:
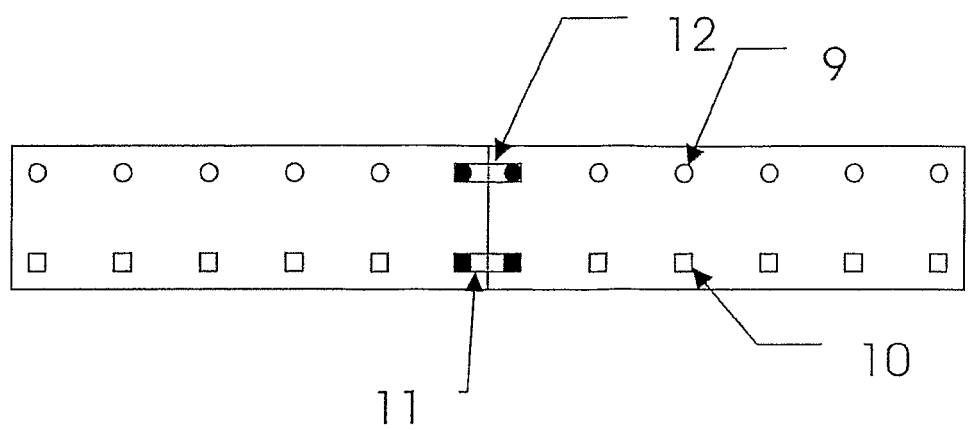
FIG. 3 shows two panels with a rectangular underside, which are connected to each other by means of tongue and groove fastening means.

FIG. 3 shows two panels with a rectangular underside, which are connected to each other by means of tongue and groove fastening means (not shown). Along the longitudinal sides, the underside is provided with bushes 9 having a rounded cross section and with other bushes 10 having a rectangular cross section. The bushes 9 are electrically connected to a conductive section 3 and the bushes 10 are electrically connected to another conductive section 3. A flat strip cable 11 having protruding contacts with a rectangular cross section connects two bushes 10 with each other, which belong to different panels. A flat strip cable 12 having protruding contacts on one side with rounded cross section correspondingly connects two bushes 9 electrically with each other.

The invention claimed is:

1. An element for a wall, ceiling or floor covering including a heating means, and two different bushes which differ from each other by means of diameter or shape, or both, and which are electrically connected with different conductive sections of the heating means.

2. The element according to claim 1, wherein the element is a floor panel, and the heating means are arranged in the upper third of the floor panel, as seen from an upper surface of the covering.

3. The element according to claim 1, wherein the heating means are arranged between a carrying board and a decor layer.

4. The element according to claim 1, wherein the heating means is formed of cords.

5. The element according to claim 1, wherein the heating means are provided in the form of a network, meshwork or web.

6. The element according to claim 5, wherein the meshwork is formed from heating cords which run parallel to each other and by electrically non-conductive cords which run perpendicular to the heating cords.

7. The element according to claim 1, wherein the heating means comprise metallically coated cords.

8. The element according to claim 1, wherein the heating means comprise glass fibers.

9. The element according to claim 8, wherein the glass fibers are at least partially metallically coated.

10. The element according to claim 1, wherein the element is a laminate or parquet panel, which is provided on a top side with a decor paper or a layer consisting of wood, adjacent to the heating means.

11. The element according to claim 1, wherein the bushes lead out of an underside of the element.

12. A plurality of elements) according to claim 1, each element having a rectangular surface with large and small sides, and the elements being connected electrically as well as mechanically at the small sides.

13. The plurality of element according to claim 12, wherein the elements are connected electrically at the small sides by means of flat strip conductors having protruding contacts.

14. The element according to claim 1, having multiple layer systems above a carrying board, wherein a top most layer system is impregnated with a resin.

15. The element according to claim 1, wherein the element is a floor panel.

16. The element according to claim 1, wherein the heating means comprise a NiCr-alloy.

17. Heating means for an element according to claim 1, wherein the heating means is a network, meshwork or web, comprising heating cords running parallel to each other and electrically non-conductive cords running perpendicular to the heating cords, as well as electrically conductive sections, running parallel with the electrically non-conductive cords.

* * * * *

UNITED STATES PATENT AND TRADEMARK OFFICE
CERTIFICATE OF CORRECTION

PATENT NO.       : 8,471,181 B2
APPLICATION NO.  : 11/996877
DATED            : June 25, 2013
INVENTOR(S)      : Döhring et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1712 days.

Signed and Sealed this
Eighth Day of September, 2015

Michelle K. Lee
*Director of the United States Patent and Trademark Office*